US011621597B2

United States Patent
Yagyu

(10) Patent No.: US 11,621,597 B2
(45) Date of Patent: Apr. 4, 2023

(54) FLUID COOLED MOTOR AND COOLING DEVICE USING THEREOF

(71) Applicant: KUBOTA CORPORATION, Osaka (JP)

(72) Inventor: Sumio Yagyu, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 59 days.

(21) Appl. No.: 17/065,803

(22) Filed: Oct. 8, 2020

(65) Prior Publication Data

US 2021/0203202 A1    Jul. 1, 2021

(30) Foreign Application Priority Data

Dec. 25, 2019   (JP) .............................. JP2019-234506

(51) Int. Cl.
*H02K 1/32*   (2006.01)
*H02K 9/19*   (2006.01)

(52) U.S. Cl.
CPC ................. *H02K 1/32* (2013.01); *H02K 9/19* (2013.01); *H02K 2213/03* (2013.01)

(58) Field of Classification Search
CPC ............ H02K 9/19; H02K 1/32; H02K 1/278; H02K 2213/03
USPC .......................................................... 310/54
See application file for complete search history.

(56) References Cited

U.S. PATENT DOCUMENTS

| | | | | |
|---|---|---|---|---|
| 7,952,240 B2 * | 5/2011 | Takenaka | ................. | H02K 1/20 310/58 |
| 8,928,195 B2 * | 1/2015 | Ohashi | ..................... | H02K 1/32 310/58 |
| 9,627,943 B2 * | 4/2017 | Tokunaga | ................ | H02K 9/19 |
| 9,806,572 B2 * | 10/2017 | Yamagishi | ............... | H02K 9/19 |
| 9,954,419 B2 * | 4/2018 | Kitta | ........................ | H02K 9/10 |

(Continued)

FOREIGN PATENT DOCUMENTS

| | | | | |
|---|---|---|---|---|
| JP | 10336968 A | * | 12/1998 | ............ B60L 11/123 |
| JP | 2005-6429 A | | 1/2005 | |

(Continued)

OTHER PUBLICATIONS

Translation of foreign document JP 10336968 A (Year: 1998).*

(Continued)

*Primary Examiner* — Alex W Mok
(74) *Attorney, Agent, or Firm* — Greenblum & Bernstein, P.L.C.

(57) ABSTRACT

A fluid cooled motor includes a stator, a rotor disposed in the stator rotatably in a circumferential direction, and a stator coil wound on the stator, the stator coil having coil ends extending in an axial direction perpendicular to the circumferential direction. The rotor has a rotor core and annular end plates fixed to axial ends of the rotor core, the annular end plates opposing to the coil ends of the stator coil and being rotatable with the rotor in the circumferential direction. Each of the end plates includes a plurality of flow passages to guide a cooling fluid from an inlet to an outlet thereof in a radially outward direction. Each of the flow passages extends from the inlet to the outlet, and inclines or curves to a direction opposite to a rotation direction of the rotor with respect to a radial direction.

7 Claims, 11 Drawing Sheets

(56) References Cited

U.S. PATENT DOCUMENTS

| | | | |
|---|---|---|---|
| 2010/0045125 A1* | 2/2010 | Takenaka | H02K 1/20 |
| | | | 310/54 |
| 2013/0278091 A1* | 10/2013 | Ohashi | H02K 5/10 |
| | | | 310/58 |
| 2014/0125165 A1* | 5/2014 | Miyamoto | H02K 9/19 |
| | | | 310/54 |
| 2017/0310190 A1 | 10/2017 | Degner et al. | |
| 2018/0069455 A1* | 3/2018 | Engblom | H02K 9/19 |
| 2019/0229571 A1* | 7/2019 | Yasuda | H02K 1/32 |
| 2019/0238029 A1* | 8/2019 | Kajikawa | H02K 21/14 |

FOREIGN PATENT DOCUMENTS

| | | |
|---|---|---|
| JP | 2010-45909 | 2/2010 |
| JP | 2011-083139 A | 4/2011 |
| JP | 2011-087434 A | 4/2011 |
| JP | 2013-62926 | 4/2013 |
| JP | 2015-23652 | 2/2015 |
| JP | 2016-135078 A | 7/2016 |
| JP | 2018-27003 | 2/2018 |
| JP | 2019-134506 | 8/2019 |

OTHER PUBLICATIONS

Extended European Search Report issued in corresponding European Patent Application No. 20201077.3, dated Mar. 30, 2021.
Office Action issued in Corresponding JP Patent Application No. 2019-234506, dated Nov. 1, 2022, along with an English translation thereof.

* cited by examiner

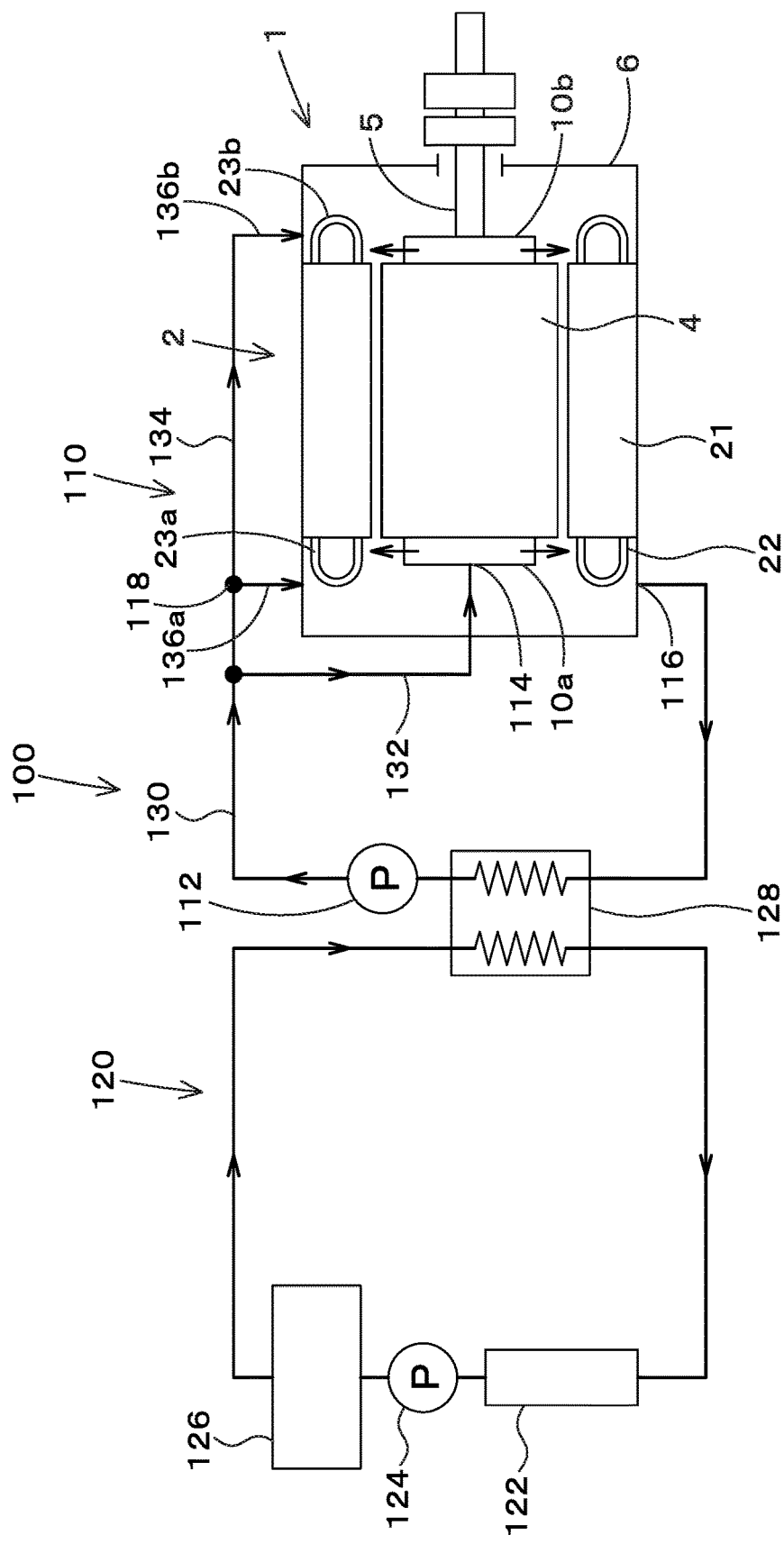

FLUID COOLED MOTOR AND COOLING DEVICE USING THEREOF

CROSS REFERENCE TO RELATED APPLICATIONS

The present application claims priority under 35 U.S.C. § 119 to Japanese Patent Application No. 2019-234506, filed Dec. 25, 2019, of which entire content is incorporated herein by reference.

BACKGROUND OF THE INVENTION

Field of the Invention

The present invention relates to a fluid cooled motor that functions as a prime mover and a generator, and a cooling device using thereof.

Description of the Related Art

A motor (PM motor) using permanent magnets for rotors is widely used in automobiles and industrial machinery (agricultural machinery and construction machinery, etc.) thanks to its compact size and powerful output.

A permanent magnet is gradually demagnetizing with higher temperature and completely loses the magnetic force beyond the Curie point (thermal demagnetization). As such, the motor using the permanent magnet made of highly magnetic material requires to be efficiently cooled to prevent from being overheated (i.e., avoiding weaker magnetization or thermal demagnetization) in a stable operation in order to maintain the normal rotation characteristic. Therefore, the motor is often required to be cooled down by a fluid cooling device with a high cooling efficiency.

Such a motor (a fluid cooled motor) that is cooled by the fluid cooling device is known as described, for example, in Japanese Patent Application Publication JPA 2005-006429. The motor disclosed therein comprises a stator having a stator core and a rotor having a rotor core. The stator core includes a plurality of slots provided in a motor case and extending in an axial direction thereof, and a plurality of stator coils wound around each of the slots. The rotor core is rotatably arranged within a hollow space of the stator core. During operation of the motor (fluid cooled motor), the temperature of the coil end of the stator coil is higher than that of the center portion thereof, and therefore, the coil end of the stator coil particularly requires to be efficiently cooled down.

To address this, for example, a Japanese Patent Publication Application No. 2005-006429 (JP 2005-006429 A) discloses the rotor including a cooling fluid passage for guiding the cooling fluid along the rotating axis and an inclined surface (an inclined portion) for scattering the cooling fluid from the end surface of the rotor core toward the coil end by the centrifugal force generated when the rotor core is rotated, thereby to cool down the coil end of the stator coil.

However, according to the motor disclosed therein, the cooling fluid guided on the inclined surface of the rotor simply scatters toward the coil end, and the scattered cooling fluid is dispersed in the axial direction, and does not properly reach the coil end to be cooled. Also, even when the cooling fluid reaches the coil end, the cooling effect of the scattered cooling fluid is limited.

SUMMARY OF THE INVENTION

Accordingly, in view of the above-described drawback, one aspect of the present invention has an object to provide a fluid cooled motor and a cooling device using thereof which can cool down the coil end in a more efficient manner with a simpler structure.

One embodiment of the present invention provides a fluid cooled motor, which comprises a stator, a rotor disposed in the stator rotatably in a circumferential direction, and a stator coil wound on the stator, the stator coil having coil ends extending in an axial direction perpendicular to the circumferential direction. The rotor has a rotor core and annular end plates fixed to axial ends of the rotor core, the annular end plates opposing to the coil ends of the stator coil and being rotatable with the rotor in the circumferential direction. Each of the end plates includes a plurality of flow passages to guide a cooling fluid from an inlet to an outlet thereof in a radially outward direction. Each of the flow passages extends from the inlet to the outlet, and inclines or curves to a direction opposite to a rotation direction of the rotor with respect to a radial direction.

The end plates may be configured to eject the cooling fluid from the outlet in the radially outward direction perpendicular to the axial direction upon rotation of the rotor.

Optionally, each of the flow passages is formed in an arcuate or straight shape.

Each of the flow passages may be curved so that a curvature thereof increases gradually as it extends from the inlet toward the outlet.

Preferably, the cooling fluid is ejected from the outlet of the end plate so as to impinge onto the coil end of the stator coil.

Thus, the cooling fluid may be ejected from the outlet of the end plate at an ejection velocity vector $v_1$ having an inclined angle $\theta$ with respect to the radial direction, wherein the outlet of the end plate rotates at a movement velocity vector $v_2$ having a rotation speed $v_2$ in a tangential direction upon rotation of the rotor, and the ejection velocity vector $v_1$ and the movement velocity vector $v_2$ substantially satisfy the following equation.

$$\vec{V_2} = \vec{V_1} \cdot \sin\theta$$

Preferably, the end plates include a rear end plate fixed to a rear end of the rotor core, and a front end plate fixed to a front end of the rotor core, and each of the rear end plate and the front end plate may include a plurality of the flow passages equiangularly spaced apart from one another along the circumferential direction.

The rotor may include a rotating shaft and a cylindrical body disposed between the rotating shaft and the rotor core, and the cylindrical body defines a plurality of communicating holes extending in the axial direction and in fluid communication with the flow passages of the rear end plate and the front end plate.

Another embodiment of the present invention provides a cooling device, which comprises a fluid cooled motor as described above, which includes a feed port for receiving a cooling fluid and a drain port for draining the cooling fluid, and a heat exchanger connected to the feed port and the drain port of the fluid cooled motor. The cooling fluid is circulated between the fluid cooled motor and the heat exchanger only by a suction force of the fluid cooled motor which is caused by a centrifugal force applied to the cooling fluid that is guided along the flow passages, upon rotation of the rotor.

The above and other elements, features, steps, characteristics and advantages of the present invention will become more apparent from the following detailed description of the preferred embodiments with reference to the attached drawings.

BRIEF DESCRIPTION OF THE DRAWINGS

It is to be understood that the attached drawings are for purposes of illustrating the concepts of the invention and may not be to scale. Identical reference numerals have been used, where possible, to designate identical features that are common to the figures.

FIG. 5 is a flow circuit diagram of a cooling device according to the present embodiment of the present embodiment.

DETAILED DESCRIPTION OF THE PREFERRED EMBODIMENTS

Figure 1:
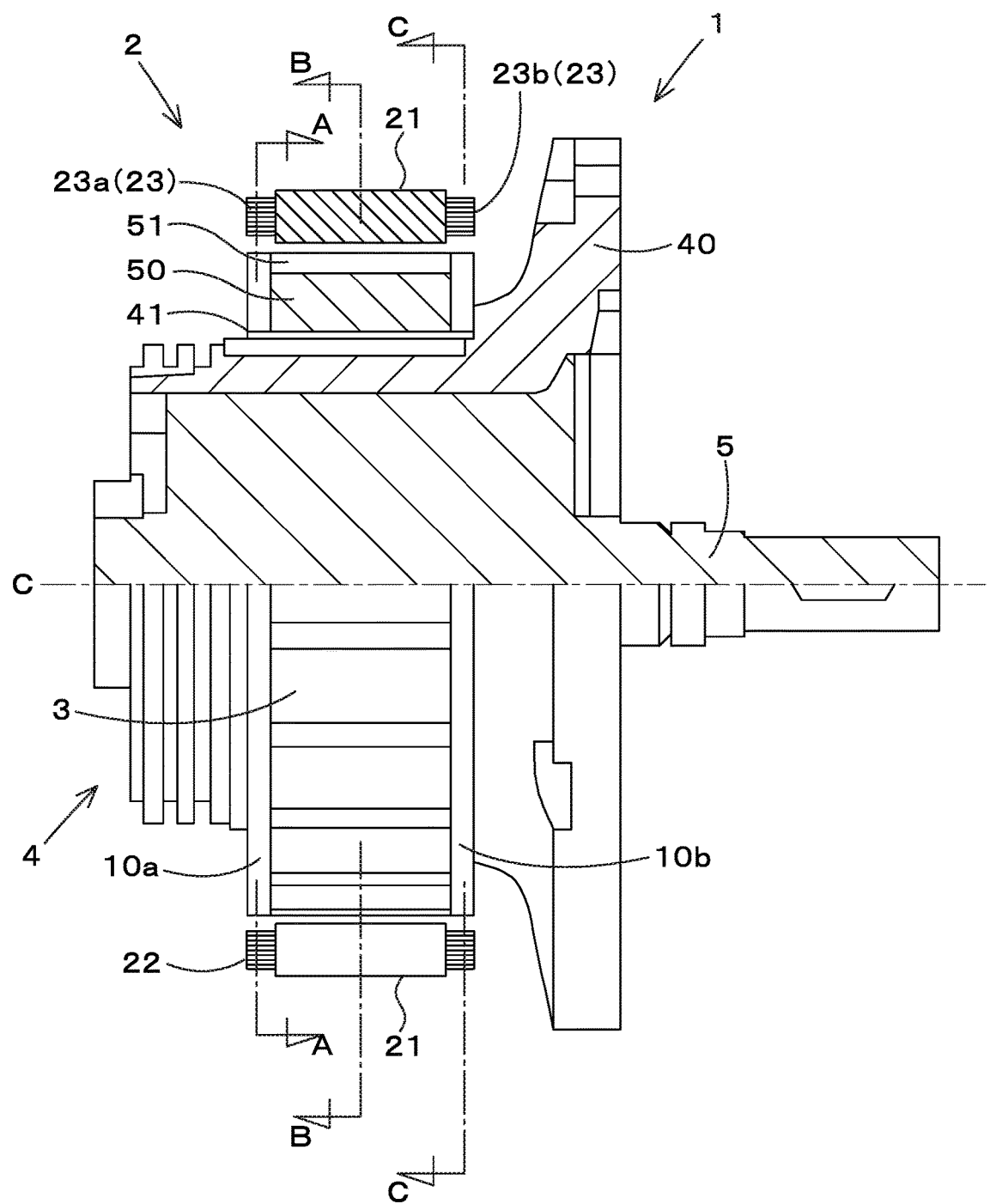
FIG. 1 is a partial cross-sectional view of a rotor of a fluid cooled motor according to a preferred embodiment of the present invention.

With reference to attached drawings, preferred embodiments according to the present invention will be described hereinafter, wherein like reference numerals designate corresponding or identical elements throughout the drawings.

As shown in FIG. 1, a fluid cooled motor 1 according to an embodiment of the present invention includes a stator 2 having a stator core 21, a rotor 4 having a rotor core 3, and a rotating shaft 5. The fluid cooled motor 1 of the present embodiment can be used, for example, as a motor for driving a hydraulic pump or as a motor generator that functions as a prime mover and a generator.

The stator core 21 is formed in a substantially cylindrical shape and is constructed by a plurality of stacked steel sheets. The stator core 21 includes an annular yoke and a plurality of teeth spaced apart from one another, each protruding to the inner circumferential side of the yoke. A plurality of slots are provided between the adjacent teeth.

The rotor 4 is arranged within the stator 2 rotatably in a circumferential direction. In the following description, the circumferential direction is referred to as a direction along a circle about the central axis C of the rotor core 3 (or rotating shaft 5), and the axial direction is referred to as a direction parallel to the central axis C (and perpendicular to the circumferential direction). Also, one of the axial directions (the rightward direction in FIG. 1) is referred to as a forward direction, and the other one of them (the leftward direction in FIG. 1) is referred to as a rearward direction.

A stator coil 22 is wound around the stator 2. Specifically, each of the stator coils 22 is wound around one of the teeth of the stator core 21, and is received in one of the slots. The stator coil 22 has a pair of coil ends 23 extending and being exposed from the slots of the stator core 21. The coil ends 23 include a rear coil end 23a and a front coil end 23b. Both of the coil ends 23 extend axially from the stator core 21, and thus the rear coil end 23a and the front coil end 23b extend rearward and forward from the stator 2, respectively.

Figure 2A:
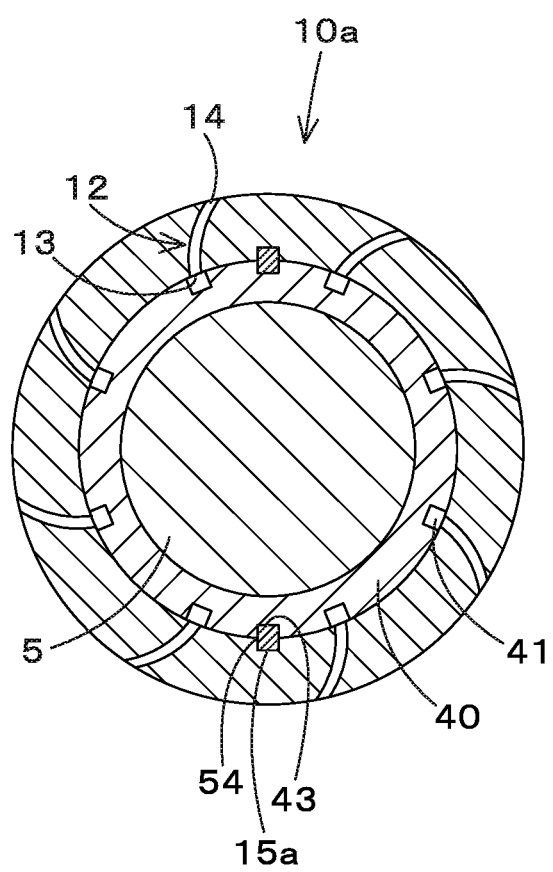
FIGS. 2A, 2B and 2C are cross-sectional views of the rotor taken along lines of A-A, B-B, and C-C of FIG. 1, respectively.
Figure 2B:
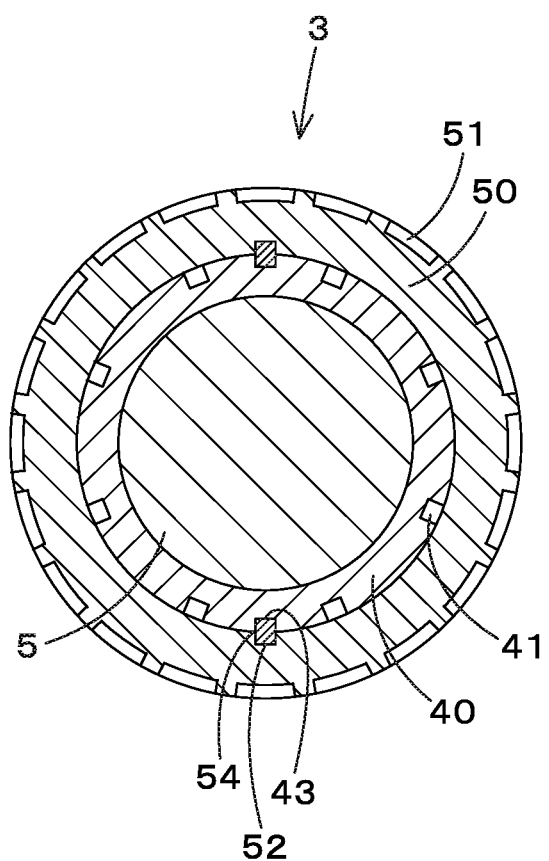
Figure 2C:
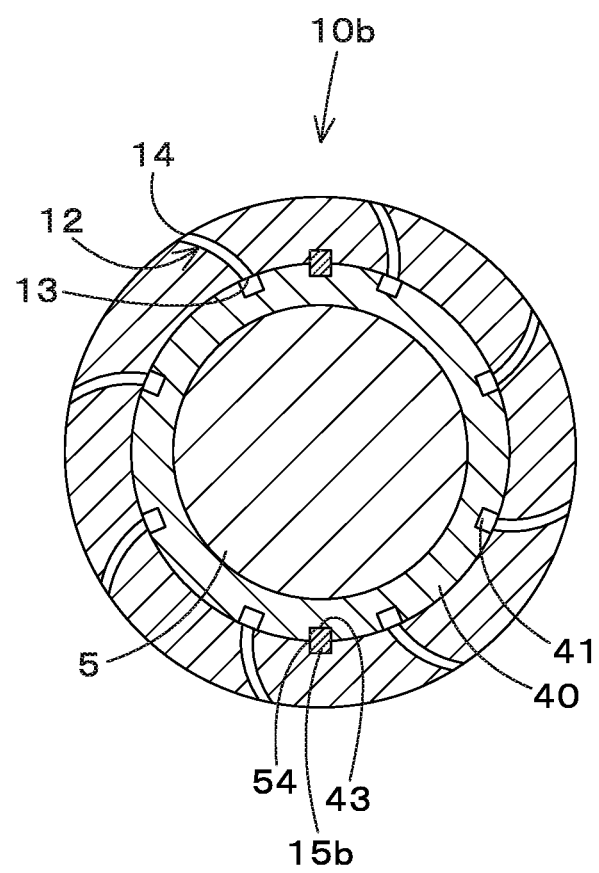

FIGS. 2A, 2B and 2C are cross-sectional views of the rotor 4 taken along lines of A-A, B-B, and C-C of FIG. 1, respectively. The rotor core 3 has a tubular body 40 and a magnet support 50, as shown in FIG. 1 and FIGS. 2A-2C.

The tubular body 40 is arranged between the rotating shaft 5 and the magnet support 50 in the radial direction of the rotor core 3. The tubular body 40 includes a plurality of communicating grooves 41 extending in the axial direction. Each of the communicating grooves 41 is formed or recessed on the outer surface of the tubular body 40 and circumferentially spaced apart from one another. The magnet support 50 supports a plurality of permanent magnets 51 thereon. Each of the permanent magnets 51 is spaced apart from one another in a circumferential direction on the magnet support 50. In the present embodiment, the permanent magnets 51 are disposed in the recess formed on the outer peripheral side of the magnet support 50, but may be embedded in and near the outer peripheral side of the magnet support 50.

The rotating shaft 5 is inserted and secured within the inner peripheral side of the tubular body 40. The magnet support 50 is fitted and secured to the outer peripheral side of the tubular body 40. As such, rotation of the rotor core 3 causes the rotating shaft 5, the tubular body 40 and the magnet support 50 to rotate together with the rotor core 3.

The rotor 4 has a pair of end plates 10 (10a and 10b) disposed at axial ends of the rotor core 3, and thus a pair of end plates 10a and 10b disposed at both ends of the rotor core 3 in the axial direction. Thus, the end plates 10 include a rear end plate 10a disposed at the rear end and a front end plate 10b disposed at the front end of the rotor core 3. The end plates 10a and 10b are formed in an annular (circular) shape. FIG. 2A shows the rear end plate 10a, and FIG. 2C shows the front end plate 10b. The rear end plate 10a and the front end plate 10b rotate together with the rotor 4 in the same direction when the rotor 4 rotates. As shown in FIG. 1, the end plates 10a and 10b are opposed to the coil ends 23 in the radial direction. Specifically, the rear end plate 10a is radially opposed to the rear coil end 23a, and the front end plate 10b is radially opposed to the front coil end 23b Each of the communicating grooves 41 of the tubular body 40 extends axially across the rear end plate 10a, the magnet support 50, and the front end plate 10b, and defines a communicating hole or passage 41 extending axially within the rotor core 3 along the inner peripheral sides of the rear end plate 10a, the rotor core 3, and the front end plate 10b. The cooling fluid (cooling oil) flows through the communicating passages 41 defined along the rear end plate 10a, the rotor core 3, and the front end plate 10b, which is used to cool the coil end 23.

The rear end plate 10 has a first recess 15a formed on the inner peripheral side thereof (FIG. 2A). The magnet support 50A has a second recess 52 formed on the inner peripheral side thereof (FIG. 2B). The front end plate 10b has a third recess 15b formed on the inner peripheral side thereof (FIG. 2C). The first, second and third recesses 15a, 52, and 15b are arranged in series or aligned in the axial direction. The tubular body 40 has a fourth recess 43 on the outer peripheral side thereof, which is opposed to the first, second and third recesses 15a, 52, and 15b (FIGS. 2A-2C). An axially extending key 54 is inserted into the space which is defined between the first, second and third recesses 15a, 52, 15b, and the fourth groove 43. This key 54 integrally connects the tubular body 40, the rear end plate 10a, the magnet support 50, and the front end plate 10b, allowing them to rotate together without relative rotation among them.

Since the coil end 23 of the stator coil 22 has a temperature higher than the central portion thereof during operation of the fluid cooled motor 1, it is particularly required to cool down the coil end 23 in an efficient manner. The fluid cooled motor 1 according to the present embodiment is configured to improve the cooling efficiency on the coil ends 23.

Since the rear end plate 10a and the front end plate 10b are similarly structured, the rear end plate 10a will mainly be described herein with reference to FIGS. 1-4.

Figure 3A:
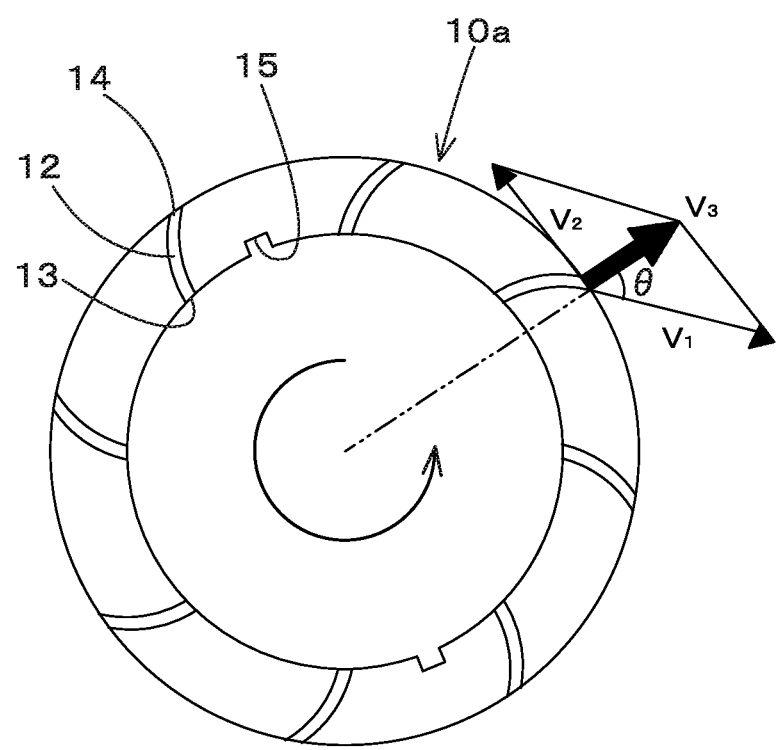
FIG. 3A is a plan view of a rear end plate according to the present embodiment.

FIG. 3A is a plan view of the rear end plate 10a in accordance with the present embodiment. The rear end plate 10a has a plurality of flow passages 12 in communication with the communicating passages 41 each defined by the communicating groove 41 of the tubular body 40. As shown in FIG. 2, each of the flow passages 12 includes an inlet 13 and an outlet 14, and has the same or similar shape and is equiangularly spaced along the circumferential direction. Thus, each of the flow passages 12 is configured such that the inlet 13 thereof communicates with the respective communicating passage 41.

The inlet 13 of the flow passage 12 is open to the inner peripheral side of the rear end plate 10a, and the outlet 14 is open to the outer peripheral side of the rear end plate 10a. The outlet 14 of the flow passage 12 is preferably configured as a nozzle or orifice having a relatively small cross-sectional area so as to eject the cooling fluid vigorously (at a high speed).

Each of the flow passages 12 of the rear end plate 10a may be formed as a through hole that passes from the inlet 13 to the outlet 14, or a groove on the surface (the front surface) of the rear end plate 10a combined with a flat plate facing the groove thereof. Each of the flow passages 12 may have the cross-section shaped in a circular, rectangular, or the other configuration. Each of the flow passages 12 is configured to guide the cooling fluid in the radially outward direction of the rotor 4 from the inlet 13 to the outlet 14. If the flow passages 12 of the rear end plate 10a are formed as through holes, FIGS. 3A and 3B should illustrate them with an imaginary or dashed line, however they are conveniently illustrated herein with a sold line.

Meanwhile, as shown in FIG. 5, the fluid cooled motor 1 includes a feed port 114 for receiving the cooling fluid and a drain port 116 for draining the cooling fluid. The cooling fluid is introduced into the motor case 6 which houses the stator 2 and the rotor 4, and then guided to the feed port 114. The cooling fluid is drained from the drain port 116 of the motor case 6 and again fed back to the feed port 114 through a primary cooling loop 110, which will be described later. The cooling fluid fed to the feed port 114 is guided to each of the inlets 13 of the flow passages 12 of the rear end plate 10a and the front end plate 10b through the communicating hole 41. Although not illustrated in the drawings, the fluid cooled motor 1 is provided with a connection passage for fluid communication between the feed port 114 and the communicating hole 41. The connection passage may include, for example, an axial passage extending in a direction parallel to the axial direction and an annular passage extending in a circumferential direction (neither not shown). That is, the feed port 114 is connected to the axial passage, which is connected to the annular passage, which in turn is connected to the commutating hole 41. The communicating hole 41 is branched and connected to the inlet 13 of each of the flow passages 12 of the rear end plate 10a and the front end plate 10b. As such, the cooling fluid supplied to the feed port 114 is branched to the flow passages 12 of the rear end plate 10a and the front end plate 10b through the axial passage, the annular passage, and the communicating hole 41, and is guided to the inlet 13 of the end plates 10. The arrangement and the configuration of the connection passages are not limited to a particular one as long as the cooling fluid fed to the feed port 114 can smoothly be guided to the communicating hole 41. In FIG. 5, the feed port 114 is provided on the rear end plate 10a, but the feed port 114 may be provided on the front end plate 10b.

Each of the flow passages 12 of the rear end plate 10a according to the present embodiment is configured to extend from the inlet 13 to the outlet 14 and to incline or curve to a direction opposite to the rotation direction of the rotor 4 with respect to a base line extending along the radial direction of the rear end plate 10a. In other words, each of the flow passages 12 extends from the inlet 13 to the outlet 14 with an inclined or curved portion therebetween, in which the portion is inclined or curved to a direction against the rotation direction of the rotor 4.

For example, in case where the rotor 4 rotates in a counter-clockwise direction when viewed from the rear side (from A-A line in FIG. 1), each of the flow passages 12 of the rear end plate 10a is configured to extend from the inlet 13 to the outlet 14 and to incline or curve toward a clockwise direction with respect to the base line as represented by a two-dotted line in FIG. 3A. When the front end plate 10b is viewed from a forward side (from C-C line in FIG. 1), the rotor 4 rotates in a clockwise direction. As shown in FIG. 2C, each of the flow passages 12 of the front end plate 10b extends from the inlet 13 to the outlet 14 and to incline or curve toward a counter-clockwise direction with respect to the radial direction of the front end plate 10b.

As such, the cooling fluid guided to the inlet 13 of the flow passage 12 is sucked into the flow passage 12 by the centrifugal force due to the rotation of the rotor 4, and ejected from the outlet 14 toward the predetermined ejection direction at a predetermined ejection speed $v_1$. The ejection velocity $v_1$ has a relative speed with respect to the end plate 10 at the outlet 14, and the ejection direction defined by a predetermined angle θ to the radial direction. The ejection velocity vector $v_1$ of the cooling fluid is represented by a thin arrow in FIG. 3A.

On the other hand, in case where the rotor 4 rotates in the counter-clockwise direction when viewed from the rear side (from A-A line in FIG. 1), the outlet 14 of the flow passage 12 similarly rotates in the counter-clockwise direction, and the rotation speed $v_2$ at the outlet 14 of the end plate 10 is given by a product of the radius r and the angular speed ω ($v_2$=rω), and the direction of the movement velocity at the outlet 14 is defined as a tangential direction at the outlet 14 of the end plate 10. The movement velocity vector $v_2$ of the cooling fluid is indicated by a thin arrow in FIG. 3A. Accordingly, the rotation of the rotor 4 causes the cooling fluid to be ejected from the outlet 14, having an actual velocity vector v3 (represented by a thick arrow in FIG. 3A) which is obtained by combining the ejection velocity vector $v_1$ and the movement velocity vector $v_2$.

In the meantime, the cooling efficiency can be substantially enhanced if a jet stream of the cooling fluid is perpendicularly impinged onto the cooled object such as the coil end 23 (referred to as an impinging jet cooling effect). Thus, according to the impinging jet cooling effect, the jet stream of the cooling fluid impinging onto the object to be cooled in a very perpendicular direction causes a substantial amount of the convective heat transfer between the cooling fluid and the object, and the higher speed of the ejected cooling fluid promotes the more convective heat transfer so as to achieve the higher cooling efficiency. In other words, when the cooling fluid is impinged onto the cooled object in an oblique direction rather than the perpendicular direction, the relative speed of the cooling fluid with respect to the cooled object is reduced with the cooling efficiency reduced.

Accordingly, the end plate 10 according to the present embodiment is configured such that, when the rotor 4 rotates, the cooling fluid is ejected from the outlet 14 thereof in a direction radially outward and perpendicular to the axial direction. This allows the cooling fluid (the jet stream thereof) ejected from the outlet 14 to impinge onto the coil end 23 in the perpendicular direction so as to efficiently cool down the coil end 23 due to the impinging jet cooling effect.

Figure 3B:
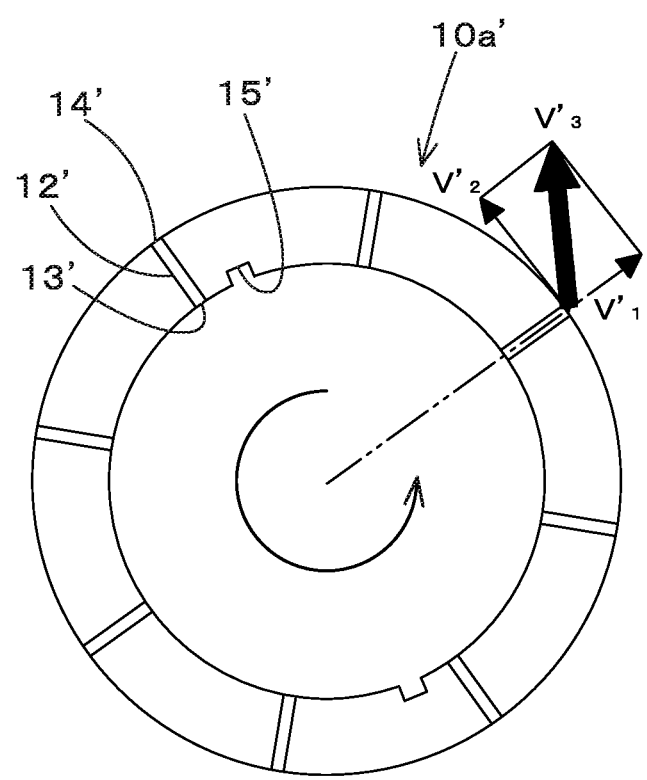
FIG. 3B is a plan view of another rear end plate according to a comparative example.

For comparison, the cooling effect of the cooling fluid ejected from a comparative rear end plate 10a' as shown in FIG. 3B will be discussed hereinafter. The flow passage of the rear end plate 10a' according to the comparative example has the same configuration as the end plate 10a according to the present embodiment except that the flow passage extends straight in the radial direction.

The cooling fluid fed to the inlet 13' of the flow passage 12' is guided to the flow passage 12', and is ejected outward by the centrifugal force in the radial direction (centrifugal direction) from the outlet 14' at a predetermined ejection speed $v_1'$. The ejection speed $v_1'$ is the relative speed with respect to the discharge port 14' of the end plate 10a'. The rotation speed $v_2$ of the outlet 14' at the outlet 14' is similarly given by the product ($v_2=r\omega$) of the radius r and the angular speed $\omega$, and the direction of the movement velocity is defined as a tangential direction at the outlet 14'. As shown in FIG. 3B, the direction of the velocity vector v3' obtained by combining the ejection velocity vector $v_1'$ and the movement velocity vector $v_2$ is inclined to the rotation direction with respect to the radial direction. Thus, the cooling fluid cannot be ejected from the comparative outlet 14' in a direction radially outward and perpendicular to the axial direction. Therefore, the cooling fluid cannot impinge onto the coil end 23 in the perpendicular direction to achieve the impinging jet cooling effect so as to cool down the coil end 23 in an efficient manner.

Figure 4A:
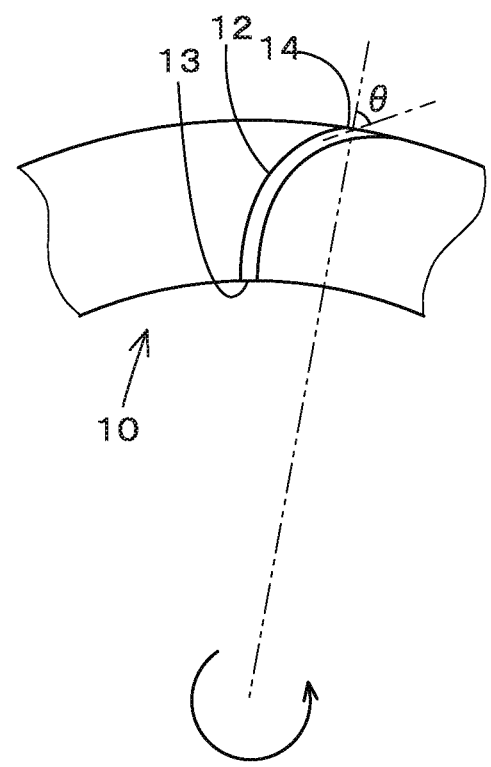
FIG. 4A is an enlarged plan view of the flow passage of the end plate of FIG. 3A, and FIG. 4B-4D are enlarged plan views of the flow passage of the end plate according to modifications of the present embodiment.

FIG. 4A is an enlarged plan view of the flow passage 12 of the end plate 10 shown in FIG. 3A, and FIGS. 4B-4D are enlarged plan views of the flow passage 12 of the end plate 10 according to modifications of the present embodiment.

As shown in FIGS. 3A and 4A, the flow passage 12 of the end plate 10 according to the present embodiment extends from the inlet 13 to the outlet 14 with an inclined or curved portion therebetween, in which the portion is inclined or curved toward a direction against the rotation direction of the rotor 4, and is formed in an arcuate shape. Specifically, as shown in FIG. 4A, the end plate 10 is configured such that an extended direction along the flow passage 12 at the outlet 14 (at the outer periphery of the end plate 10) denoted by the one-dotted line defines an angle θ with the radial direction denoted by the two-dotted line. As described above, the flow passage 12 is configured to be inclined or curved in a direction opposite to the rotation direction, so that the cooling fluid is ejected from the outlet 14 onto the coil end 23 in the direction that cancels the circumferential or rotation speed $v_2$ of the end plate 10, thereby to improve the cooling efficiency on the coil end 23.

Figure 4B:
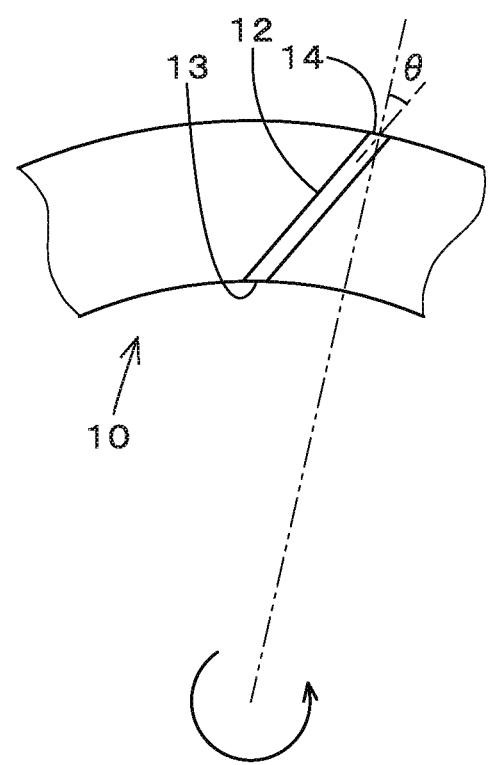

The flow passage 12 shown in FIG. 4B extends straight from the inlet 13 to the outlet 14 to incline in a direction opposite to the rotational direction with respect to the radial direction of the end plate 10, and is formed in a linear shape.

Figure 4C:
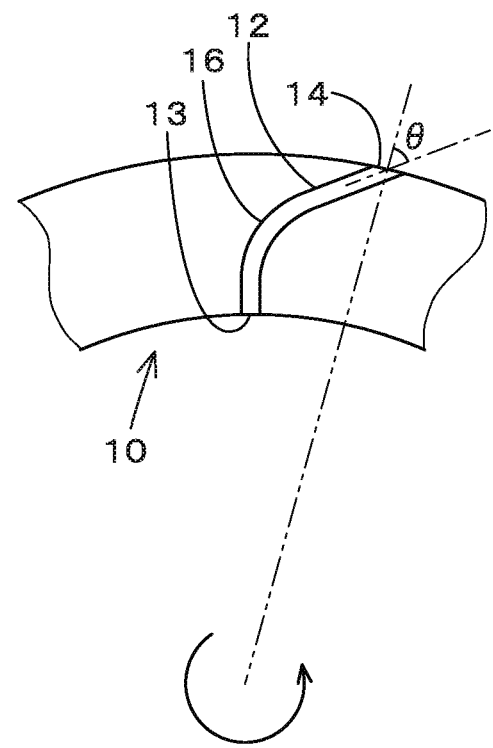

Also, the flow passage 12 shown in FIG. 4C extends straight in the radial direction of the end plate 10 near the inlet 13 (the inner peripheral side of the end plate 10), bends substantially in the direction opposite to the rotation direction around the middle portion 16 of the flow passage 12, and extends straight again between the intermediate portion 16 and the outlet 14 of the flow passage 12.

Figure 4D:
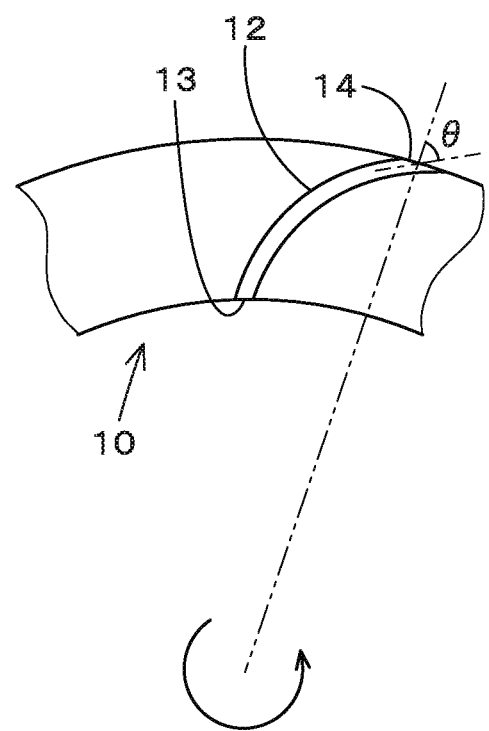

The flow passage 12 shown in FIG. 4D extends and curves at a constant curvature, which is formed in a circular arc shape. Although not shown, the flow passage 12 may be curved so that the curvature increases gradually as it extends from the inlet 13 toward the outlet 14.

Similar to the end plate 10 shown in FIG. 4A, the end plate 10 shown in FIGS. 4B to 4D are configured such that the inclined angle θ is defined between the extended direction along the flow passage 12 at the outlet 14 (at the outer periphery of the end plate 10) denoted by the one-dotted line and the radial direction denoted by the two-dotted line. As described above, the flow passage 12 is configured to be inclined or curved in a direction opposite to the rotation direction, so as to eject the cooling fluid from the outlet 14 in the direction that delays or cancels the circumferential or rotation speed $v_2$ of the end plate 10, thereby to improve the cooling efficiency on the coil end 23. Thus, the direction or angle at which the cooling fluid impinges onto the coil end 23 of the end plate 10 is made closer to be perpendicular or normal to the coil end 23 so as to achieve the higher cooling effect of the cooling fluid by the end plate 10 shown in FIG. 3A and FIGS. 4A to 4D than that at least by the comparative end plate 10' shown in FIG. 3B. Furthermore, the cooling fluid is ejected from the outlet 14 of the end plate 10 so as to impinge onto the coil end 23 in the direction substantially perpendicular thereto (achieving the impinging jet cooling effect), thereby to optimize the cooling efficiency by the cooling fluid. For example, the flow passage 12 formed in a streamline (such as an arcuate shape) is useful for forming a stable stream (peeling-off free stream) of the cooling fluid to achieve the impinging jet cooling effect.

Referring to FIG. 3A to discuss further in detail, in order to eject the cooling fluid (jet stream) from the outlet 14 onto the coil end 23 in the perpendicular direction, the tangential component of the velocity vector v3 obtained by combining the discharge velocity vector v and the movement velocity vector $v_2$ may designed to be substantially zero. To achieve this, the ejection velocity vector $v_1$ and the movement velocity vector $v_2$ are required to substantially satisfy the following equation.

$$\vec{V_2} = -\vec{V_1} \cdot \sin\theta$$

At this time, the speed of the ejection velocity vector $v_1$ in the radially outward direction, that is, the velocity of the jet perpendicularly impinging onto the coil end 23, is given by the product of $v_1$ and $\cos\theta$ ($v_1 \cos\theta$). As described above, since the speed of $v_2$ is given by the product of the radius r of the rear end plate 10a and the angular speed $\omega$ (i.e., rotation speed N of the motor), it is possible to optimize the velocity of the jet stream perpendicular impinging onto the coil end 23 (impinging jet cooling effect) by appropriately selecting the speed of the ejection velocity vector $v_1$, the radius r, the rotation speed N, and the incline angle θ.

In other words, the flow passage 12 can be designed so that the cooling fluid is ejected from the outlet 14 in the radially outward direction perpendicular to the axial direction for achieving the impact jet cooling effect, by determining the optimum inclined angle θ from the rotation speed N (for example, about 2500 rpm to about 3000 rpm) of the fluid cooled motor 1 in the steady driving state and the radius r of the rear end plate 10a.

The speed of the ejection velocity vector $v_1$ may also depend on the feeding capability of the cooling fluid of the pump used in the cooling device 100 to be described later, the cross-sectional area of the flow passage S, and the temperature and viscosity of the cooling fluid. In this case, the flow passage 12 may be designed by optimizing the parameters affecting the speed of the ejection velocity vector $v_1$ so that the cooling fluid is ejected from the outlet 14 in the radially outward direction perpendicular to the axial direction.

FIG. 5 is a flow circuit diagram of the cooling device 100 according to the present embodiment. The cooling device 100 of the present embodiment includes a primary cooling loop 110, a secondary cooling loop 120, and a heat exchanger 128. The primary cooling fluid is a liquid that cools down the coil end 23 of the fluid cooled motor 1. The secondary cooling fluid is a liquid that cools the primary cooling fluid. For example, the primary cooling fluid is oil and the secondary cooling fluid is water, although the present invention is not limited thereto.

The primary cooling loop 110 comprises the fluid cooled motor 1 described above, a pump 112 in fluid communicating with the fluid cooled motor 1 through the feed port 114, the drain port 116 and the flow passage 130, and a heat exchanger 128. The secondary cooling loop 120 comprises a radiator 122, a pump 124 and the heat exchanger 128, and optionally comprises an inverter 126.

The primary cooling fluid is circulated in the primary cooling loop 110 by the pump 112. Specifically, the primary cooling fluid is fed to the feed port 114 of the fluid cooled motor 1 by the driving pump 112, heated when cooling the coil end 23, drained from the drain port 116, cooled down through the heat exchanger 128 by thermally exchange with the secondary cooling fluid, and then fed back to the feed port 114.

The secondary cooling fluid is circulated in the secondary cooling loop 120 by the driving pump 124. Specifically, the secondary cooling fluid heated in the heat exchanger 128 is cooled down by the radiator 122 in the secondary cooling loop 120 and then fed back to the heat exchanger 128.

As illustrated in FIG. 5, the flow passage 130 of the primary cooling loop 110 preferably includes a main passage 132 that feeds the primary cooling fluid to the inlet 13 of the flow passage 12 of the end plate 10 through the feed port 114 and leads the primary cooling fluid to the coil end 23, and a sub-passage 134 that branches from the main passage 132 to direct the primary cooling fluid to the coil end 23 without passing through the flow passage 12. The primary cooling fluid guided in the secondary passage 134 is discharged from the outer peripheral side (the side opposite to the end plate 10) of the coil end 23 toward the coil end 23. The sub-passage 134 preferably has a first sub-passage 136a that branches at the branch point 118 to direct the primary cooling fluid to the rear coil end 23a without passing through the flow passage 12, and a second sub-passage 136b that directs the primary cooling fluid directly to the front coil end 23b without passing through the flow passage 12. By adapting such a configuration, the primary cooling fluid can be discharged from both of the outer peripheral side and the inner peripheral side of the coil end 23. Therefore, the fluid cooled motor 1 can be further efficiently cooled down.

The fluid cooled motor 1 according to the present invention is configured so that the flow passage 12 of the end plate 10 is inclined or curved in the direction opposite to the rotation direction of the rotor 4, which allows the fluid cooled motor 1 to function as a centrifugal pump for drawing the primary cooling fluid in the flow passage 12 by the centrifugal force. Therefore, the radius r, the rotation speed N, the inclined angle θ, and the ejection velocity vector $v_1$ (cross-sectional area S of the flow passage, the temperature and viscosity of the cooling oil, etc.) are optimized so that the fluid cooled motor 1 is used for circulating the primary cooling fluid within the primary cooling loop 110 with the pump 112 omitted. That is, in the cooling device using the fluid cooled motor 1 according to the present embodiment, the primary cooling fluid can be circulated between the fluid cooled motor 1 and the heat exchanger 128 only by the suction force of the fluid cooled motor 1 which guides the primary cooling fluid along the flow passage 12 by the centrifugal force along the rotation thereof.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

DESCRIPTION OF THE REFERENCE NUMERALS

1: fluid cooled motor, 2: stator, 3: rotor core, 4: rotor, 5: rotating shaft, 6: motor case, 10: end plate, 12: flow passage, 13: inlet, 14: outlet, 16: intermediate portion, 21: stator core, 22: stator coil, 23: coil end, 40: tubular body, 41: communicating hole, 50: magnet support, 51: permanent magnet, 100: cooling system, 110: primary cooling loop, 112: oil pump, 114: feed port, 116: drain port, 120: secondary cooling loop, 124: water pumps, 128: heat exchanger.

What is claimed is:

1. A fluid cooled motor, comprising:
   a stator;
   a rotor disposed in the stator rotatably in a circumferential direction; and
   a stator coil wound on the stator, the stator coil having coil ends extending in an axial direction perpendicular to the circumferential direction, wherein
   the rotor has a rotor core and annular end plates fixed to axial ends of the rotor core, the annular end plates opposing to the coil ends of the stator coil and being rotatable with the rotor in the circumferential direction;
   each of the end plates includes a plurality of flow passages to guide a cooling liquid from an inlet to an outlet thereof in a radially outward direction; and
   each of the flow passages extends from the inlet to the outlet, and inclines or curves to a direction opposite to a rotation direction of the rotor with respect to a radial direction, wherein
   the end plates are configured to eject the cooling liquid from the outlet in the radially outward direction perpendicular to the axial direction upon rotation of the rotor,
   the cooling liquid is ejected from the outlets of the end plates at an ejection velocity vector $v_1$ having an ejection speed $v_1$ and an inclined angle θ with respect to the radial direction,
   the outlets of the end plates rotate at a movement velocity vector $v_2$ having a rotation speed $v_2$ in a tangential direction upon rotation of the rotor, and
   the ejection velocity vector $v_1$ of the cooling liquid and the movement velocity vector $v_2$ of the outlets of the end plates are designed in a manner such that a tangential component of the ejection velocity vector $v_1$ is cancelled out by the movement velocity vector $v_2$, and the cooling liquid impinges onto the coil ends of the stator coil in a substantially perpendicular direction thereto, so as to cool the coil ends of the stator coil by the cooling liquid due to an impinging jet cooling effect.

2. The fluid cooled motor according to claim 1, wherein each of the flow passages is formed in an arcuate shape.

3. The fluid cooled motor according to claim 1, wherein each of the flow passages is formed in a straight shape.

4. The fluid cooled motor according to claim 1, wherein each of the flow passages is curved so that a curvature thereof increases gradually as it extends from the inlet toward the outlet.

5. The fluid cooled motor according to claim 1, wherein the end plates include a rear end plate fixed to a rear end of the rotor core, and a front end plate fixed to a front end of the rotor core; and each of the rear end plate and the front end plate includes a plurality of the flow passages equiangularly spaced apart from one another along the circumferential direction.

6. The fluid cooled motor according to claim 5, wherein the rotor includes a rotating shaft and a cylindrical body disposed between the rotating shaft and the rotor core; and the cylindrical body defines a plurality of communicating holes extending in the axial direction and in fluid communication with the flow passages of the rear end plate and the front end plate.

7. A cooling device, comprising:

a fluid cooled motor according to claim 1, the fluid cooled motor including a feed port for receiving a cooling liquid and a drain port for draining the cooling liquid; and a heat exchanger connected to the feed port and the drain port of the fluid cooled motor, wherein the cooling liquid is circulated between the fluid cooled motor and the heat exchanger only by a suction force of the fluid cooled motor which is caused by a centrifugal force applied to the cooling liquid that is guided along the flow passages, upon rotation of the rotor.

* * * * *